3,287,310
RANDOM SILOXANE COPOLYMERS CONTAINING PHENYLENE AND PHENYL ETHER CHAIN LINKAGES
George M. Omietanski, Tonawanda, N.Y., assignor to Union Carbide Corporation, a corporation of New York
No Drawing. Filed Sept. 29, 1961, Ser. No. 141,622
10 Claims. (Cl. 260—37)

This invention relates to novel copolymeric organopolysiloxane gums and to the elastomers produced therefrom. More particularly this invention relates to copolymeric organopolysiloxane gums and to the elastomers produced therefrom, which have excellent resistance to the degrading effects of gamma irradiation.

It is an object of this invention to produce novel organopolysiloxane gums which can be compounded with a filler and curing catalyst and heat-cured to yield siloxane elastomers, such elastomers having high tensile strengths and excellent resistance to the degrading effects of gamma radiation.

It is also an object of this invention to produce siloxane elastomers which retain their high tensile strengths, even on prolonged exposure to temperatures of about 250° C.

The present invention is based, in part, upon the discovery that compositions comprising (1) a copolymeric organopolysiloxane gum comprised of bis-(dimethylsilyl)-benzene siloxane units and 4,4'-bis-(dimethylsilyl)phenylether siloxane units and which can contain limited amounts of dimethylsiloxane units and hydrocarbon (olefinically unsaturated hydrocarbon) siloxane units, (2) a filler and (3) a curing catalyst, are heat convertible to elastomers which are extremely resistant to the degrading effects of gamma radiation.

The novel copolymeric organopolysiloxane gums of this invention are comprised of from 5 to 95 mole percent bis-(dimethylsilyl)benzene siloxane units

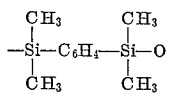

and from 5 to 95 mole percent bis-(dimethylsilyl)phenyl-ether siloxane units

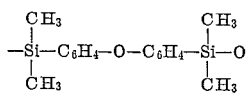

and can contain from 0 to 25 mole percent dimethylsiloxane,

units and from 0 to 1 mole percent hydrocarbon (olefinically unsaturated hydrocarbon) siloxane

units where R is a monovalent hydrocarbon group and R' is an olefinically unsaturated monovalent hydrocarbon group. It is preferred that when the copolymeric organopolysiloxane gum contains olefinically unsaturated groups of hydrocarbon siloxane units that such units be present in amounts of from 0.037 to 1.0 mole percent.

Illustrative of the monovalent hydrocarbon groups which are represented by R are, for example, alkyl groups such as methyl, ethyl, propyl, butyl and the like, cyclo-alkyl groups such as cyclopentyl, cyclohexyl and the like, aryl groups such as phenyl, naphthyl, and the like, aralkyl groups such as benzyl, phenylethyl and the like and alkaryl groups such as tolyl, xylyl and the like. Illustrative of the olefinically unsaturated monovalent hydrocarbon groups which are represented by R' are vinyl, allyl, butenyl, cyclohexenyl and the like.

The novel copolymeric polysiloxane gums of this invention are essentially linear polymers having an intrinsic viscosity number in benzene at 25° C. of 0.5 deciliter per gram or higher. These copolymeric polysiloxane gums can have viscosities ranging from pourable liquids to materials which will barely flow when unconfined. Such polysiloxane gums can have molecular weights of from 100,000 to 3,000,000 or even higher and miniature penetrometer readings of from 300 to less than 10 one tenth millimeters per 10 seconds.

The novel polysiloxane gums of this invention are random copolymeric polysiloxane gums wherein the various siloxane units which are present in said siloxane gums are attached to one another in no particular or prescribed order, and said gums are produced by the cocondensation and coequilibration of 1,4-bis-(dimethylhydroxysilyl)-benzene

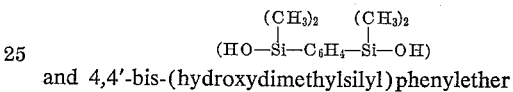

and 4,4'-bis-(hydroxydimethylsilyl)phenylether

and if desired octamethylcyclotetrasiloxane $$[(CH_3)_2SiO]_4$$

and a hydrocarbon (olefinically unsaturated hydrocarbon) siloxane, such as tetramethyltetravinylcyclotetrasiloxane at 150° C., employing a basic catalyst such as potassium hydroxide, potassium dimethylsilanolate, cesium hydroxide and the like, according to techniques known in the art.

The novel polysiloxane gums of this invention can be compounded with fillers and a curing catalyst to form a heat-curable silicone gum composition. The heat-curable silicone gum composition can then be cured to an elastomer by heating to a temperature of from about 100° C. to about 250° C. depending upon the decomposition temperature of the particular curing agent employed.

The fillers which can be employed in the silicone gum compositions and elastomers of this invention are those commonly employed in the art and include, for example, titanium dioxide, finely divided silica of the fumed or precipitated type, calcium carbonate, diatomaceous earth, silica aerogel, carbon black, alumina, quartz, coated finely divided silica, for example, alkoxy or trihydrocarbonsiloxy coated finely divided silicas, and the like. These fillers impart desirable physical properties (for example, high tensile strengths) to siloxane elastomers.

The amount of such filler employed in the compositions and elastomers of this invention can be from about 10 to 100 parts of the filler per 100 parts of the copolymeric organopolysiloxane gum. Preferably, the filler is employed in amounts of from about 25 to 50 parts by weight filler per 100 parts by weight of the copolymeric organopolysiloxane gum.

By the term "trihydrocarbonsiloxy coated silica filler" as used herein is meant a silica filler having trihydrocarbonsiloxy groups bonded to the surface thereof through siloxane bonds. These trihydrocarbonsiloxy coated silica fillers can be prepared by reacting silanes of the formula R°$_3$SiX where R° is a monovalent hydrocarbon group such as methyl, ethyl, propyl, phenyl, benzyl, vinyl, cyclohexenyl, phenylethyl and the like and X is chlorine or an alkoxy group such as methoxy, ethoxy, propoxy and the like; with a silica organogel according to the procedure described in United States Patent No. 2,863,846, or by the reaction of R°₃SiCl with a finely divided silica according to the procedure described in Canadian Patent No. 531,785 issued October 16, 1956.

In producing the improved siloxane elastomers of this invention from a copolymeric organopolysiloxane gum which contains olefinically unsaturated groups, I can employ as curing agent any of the curing agents which have heretofore been employed to produce siloxane elastomers. For example, I can employ the organic peroxides, such as, the dialkylperoxides, the diacylperoxides, and the mixed alkyl acylperoxides. Especially suitable curing agents where the copolymeric organopolysiloxane gum contains olefinically unsaturated hydrocarbon groups are the dialkyl peroxides which can be graphically depicted by the formula:

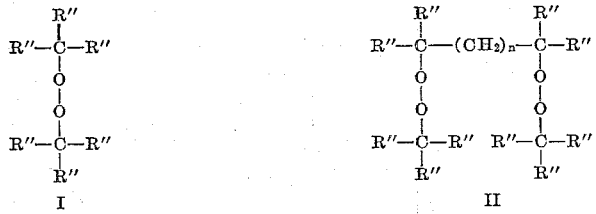

wherein R″ represents the same alkyl group throughout or alkyl groups of two or more different types and $n$ is zero (0) or a larger integer.

Among the specific curing agents which it is preferred to employ are included:

di-tertiary-butyl peroxide;
tertiary-butyl-triethylmethyl peroxide;
2,5-bis(tertiary-butylperoxy)-2,5-dimethylhexane;
tertiary-butyl-tertiary-triptyl peroxide, the composition of which is represented by the structural formula:

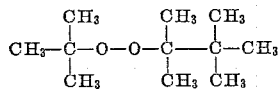

and phenyl substituted ditertiary alkyl peroxides such as dicumyl peroxide.

Other organic peroxides can be employed to cure the compositions of this invention wherein the copolymeric organopolysiloxane gum does or does not contain olefinically unsaturated groups. Such organic peroxides, when employed in appropriate amounts, will effect the same degree of curing of the improved compositions through the same agencies or through agencies in addition to the unsaturated groups, as for example, through methyl to methyl groups. In such instances not all of the groups present necessarily enter into cross-linking reactions. Typical of such peroxides are the diacyl peroxides which include benzoyl peroxide, and the like, mixed alkyl-acyl peroxides which include tertiary butyl perbenzoate, tertiary-butyl peracetate and the like, the chloroarylacyl peroxides, such as, bis-1,4-dichlorobenzoyl peroxide, bis-2,4-dichlorobenzoyl peroxide, bis-monochlorobenzoyl peroxide and the like. The bis-azo compounds, such as, alpha, alpha-azo-bis-isobutyronitrile can also be employed as a curing catalyst for the siloxane gum compositions of this invention.

In actual practice, it is preferred to employ benzoyl peroxide or the bis-chlorobenzoyl peroxides as the curing agent for compositions wherein the copolymeric organopolysiloxane gum does not contain any olefinically unsaturated groups, whereas di-tertiary-butyl peroxide is the preferred curing agent for compositions wherein the copolymeric organopolysiloxane gum contains olefinically unsaturated groups. It should be understood, of course, that benzoyl peroxide and the bis-chlorobenzoyl peroxides can be employed, also, for curing composition wherein the copolymeric organopolysiloxane gums contain olefinic unsaturated groups, but di-tertiary-butyl peroxide is preferred for these compositions because of its superior curing action. The curing catalysts may be employed in any of the commercially available forms including supported heterogeneous products. For optimum results where the catalyst is a solid, it is preferred to employ a finely divided catalyst, such as, for example, recrystallized products, because their finer particle size promote better catalyst dispersion within the compositions of the invention.

The amount of the curing catalyst employed in producing the siloxane elastomers of this invention can be from 0.1 part catalyst per 100 parts of the copolymeric organopolysiloxane gums to 2.5 parts catalyst per 100 parts gum. It is preferred to employ from 0.5 to 2.0 parts catalyst per 100 parts of the copolymeric organopolysiloxane gum in order to obtain fully cured elastomers.

The heat-curable compositions of this invention are produced by admixing at a temperature below the decomposition temperature of the curing catalyst, the copolymeric organopolysiloxane gum, filler and catalyst until a uniform dispersion is obtained.

The admixtures of the copolymeric organopolysiloxane gum, filler and curing catalyst are commonly referred to as "siloxane gum compounds."

Suitable apparatus for preparing the curable siloxane gum compounds of this invention include milling rolls operating at differential speeds, Banbury mixers and the like. According to the milling technique, the copolymeric organopolysiloxane gum is charged onto the roll mill and milled to give a uniform sheet. The filler is then added in suitable amounts and the milling continued until the filler is uniformly dispersed throughout the copolymeric organopolysiloxane gum. The curing catalyst is then added and the milling continued until uniform dispersion is obtained.

The copolymeric organopolysiloxane gum compound is then molded or extruded and cured to an elastomer by heating to a temperature sufficiently elevated to cause the curing agent to decompose thereby curing the siloxane gum compound to an elastomer. For example when a diaryl peroxide such as dibenzoyl peroxide is employed as the curing catalyst the compositions are cured to elastomers by heating to a temperature of about 250° F. for 15 to 20 minutes whereas, when a dialkyl peroxide such as di-tertiary butyl peroxide is employed (where the organopolysiloxane gum contains silicon-bonded olefinically unsaturated groups), the compositions are cured to elastomers by heating to a temperature of about 340° F. for 20 to 25 minutes.

It is sometimes desirable to age a mixture of the organopolysiloxane gum and filler prior to adding the curing catalyst thereto. Aging for a period of from about one day to one week at room temperature, or heat-aging at an elevated temperature (about about 250° F.) for a period of from about one to two hours or more provide opportunity for better wetting of the filler by the copolymeric organopolysiloxane gum. In addition, precure heat-aging effectively eliminates any objectionable volatile matter such as water and absorbed gases (carried into the mixture by the filler) at a stage wherein distortion resulting from gas elimination is not harmful, and thus reduces the amount of gas that must be eliminated by postcure heat-aging at a time when density and structural form must be retained.

At the conclusion of such aging treatments, a curing catalyst can be incorporated into the mixture and the resulting mixture heat-cured to yield an elastomer. If desired, the elastomer may then be subjected to postcure heat-aging. Such postcure treatments serve to stabilize the physical properties of the elastomer and to improve its electrical properties. Postcuring can be conducted by heating the elastomer at a temperature of about 350° F., preferably at a temperature of about 480° F., for a period of about twenty-four hours.

The compositions of this invention can also contain as a plasticizer a hydroxy or alkoxy end-blocked dihydrocarbonpolysiloxane oil. While the hydroxy or alkoxy end-blocked dihydrocarbonpolysiloxane oil is not essential to the compositions of this invention, the use of the hydroxy or alkoxy end-blocked oil gives improved milling characteristics to the compositions. The hydroxy and alkoxy end-blocked dihydrocarbonpolysiloxane oils suitable for use in the present invention are those relatively low molecular weight polysiloxane oils whose polymer chains have at least two and as much as thirty-five and more dihydrocarbonsiloxy units ($Z_2SiO$) per molecule and which contain an average of at least one hydroxyl group or alkoxy group per terminal silicon atom of the molecule. Such polysiloxanes may be represented by the general formula:

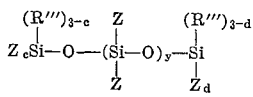

wherein Z is a monovalent hydrocarbon radical, for example alkyl groups such as methyl, ethyl, propyl and the like; aryl groups such as phenyl, naphthyl and the like, aralkyl groups such as benzyl, phenylethyl and the like, alkaryl groups, such as, tolyl, xylyl, ethylphenyl and the like; cycloalkyl groups, such as cyclopentyl, cyclohexyl and the like; alkenyl groups such as vinyl, allyl, butenyl, cyclohexenyl and the like; $R'''$ is a hydroxyl or an alkoxy group such as methoxy, ethoxy, propoxy, and the like, and $c$ has a value from 0 to 2; $d$ has a value of from 0 to 3; the sum of $c$ and $d$ is not in excess of 4, $y$ has a value of from 2 to 35 inclusive.

Most preferred for use in the composition of this invention are those hydroxy or alkoxy end-blocked polysiloxane oils having from four to twenty-five dihydrocarbonsiloxy units per molecule.

It is preferred to employ as the polysiloxane oil, a hydroxy or alkoxy end-blocked dihydrocarbon-substituted polysiloxane oils whose hydrocarbon substituents consist of one or more types of hydrocarbon groups taken from the class consisting of methyl, ethyl, phenyl, vinyl, allyl, cyclohexenyl groups. Illustrative of polysiloxane oils suitable for use in my invention are those hydroxy and alkoxy end-blocked dihydrocarbon-substituted polysiloxanes whose polymeric chains comprise one or more types of substituted siloxy units such as dimethylsiloxy, diethylsiloxy, diphenylsiloxy, methylvinylsiloxy, ethylvinylsiloxy, methylphenylsiloxy, and the like dihydrocarbonsiloxy units. Such hydroxy end-blocked polysiloxane oils can be prepared in a manner similar to that described below. By way of illustration a hydroxy end-blocked polysiloxane oil containing dimethylsiloxane units and ethylvinylsiloxane units can be prepared by heating a mixture of the cyclic tetramer of dimethylsiloxane (octamethylcyclotetrasiloxane) with the cyclic tetramer of ethylvinylsiloxane (tetraethyltetravinylcyclotetrasiloxane) and water in the presence of a catalyst, for example, ammonium hydroxide. The relative amounts of the various dihydrocarbonsiloxy units which can be present in a hydroxy end-blocked polysiloxane oil can vary over a wide range without materially affecting the properties of the improved siloxane elastomer of my invention.

Referring particularly to a hydroxy end-blocked dimethylpolysiloxane oil as an illustrative example, such oils have molecular weights of from about 300 to about 1500 and above, preferably from about 900 to about 1300 and contain hydroxy groups in an amount by weight of the oil of from about 1 percent up to about 10 percent, preferably from about 2.4 percent to about 3.5 percent. When hydroxy end-blocked polysiloxane oils contain hydrocarbon substituents other than, or in addition to, methyl groups, the molecular weight of the oils will, of course, lie in a range above that described for the dimethylpolysiloxane oils. In a like manner the hydroxy content of such polysiloxane oils would be relatively lower in value when the hydrocarbon substituents comprise groups other than, or in addition to, methyl groups. In no event will the hydroxy content of the hydroxy end-blocked dihydrocarbon-substituted polysiloxane oils be greater than 10 percent and preferably not above 3.5 percent, by weight thereof.

The amount of such plasticizer employed can be from 1 to 100 parts by weight plasticizer per 100 parts by weight of the gum. Preferably the plasticizer is employed in amounts of from 4 to 80 parts by weight plasticizer per 100 parts by weight of the gum.

Siloxane elastomers produced in accordance with the instant invention find wide use as gaskets, seals, coating composition and the like applications requiring resistance to gamma radiation.

The following experiments illustrate a method for the production of the starting materials for the production of the novel copolymeric organosiloxane gums and elastomers of this invention.

EXPERIMENT 1

(A) Magnesium turnings (197 grams, 8.1 gram-atoms) were placed in a 12-liter glass flask, equipped with a stirrer, reflux condenser, and an addition funnel. The magnesium turnings were covered with 0.7 liter of anhydrous tetrahydrofuran. The system was flushed with dry nitrogen. One gram of liquid bromine containing 0.25 gram of iodine was added and the mixture was heated to reflux. The heating was discontinued and 200 ml. of a solution of 944 grams (4 moles) of p-dibromobenzene and 1333 grams (9.0 moles) of dimethyldiethoxysilane in 1.8 liters of anhydrous tetrahydrofuran was added. The reaction initiated within 5 minutes. A color of the mixture went from yellow-brown to blue to off-white and with time to a deep grown. The remainder of the paradibromobenzene - dimethyldiethoxysilane - tetrahydrofuran solution was added over a three to four hour period at a rate sufficient to maintain gentle reflux. After the addition was complete, the mixture was heated to reflux for an additional 2 hours. The tetrahydrofuran and unreacted dimethyldiethoxysilane were removed by vacuum evaporation. The residue was then cooled and filtered to remove the magnesium salts formed. The filtrate was then subjected to fractional distillation at reduced pressure to yield 1,4-bis(dimethylethoxysilyl)benzene having a boiling point of 90° C. at 0.6 mm. Hg and a refractive index $n_D^{25}$ of 1.4756. Elemental analysis of the 1,4-bis (dimethylethoxysilyl)benzene gave the following results:

Calculated for $C_{14}H_{26}O_2Si_2$: 59.5% C; 9.3% H; 19.8% Si. Found: 59.0% C; 9.0% H; 19.8% Si.

(B) 1,4-bis(dimethylethoxysilyl)benzene (846 grams, 3 moles) and freshly distilled boron trifluoride etherate $BF_3$—$C_2H_5OC_2H_5$ (287 grams, 2.1 moles) were charged into a glass reaction vessel fitted with a thermometer well and a Vigreaux column and distillation head. The system was flushed with dry nitrogen and the flask and contents heated until the temperature of the flask and contents reached 200°C. During the period of heating volatile by-products such as, triethyl borate and the excess boron trifluoride etherate distilled from the reaction mixture. The residue was then fractionally distilled to yield 1,4-bis(dimethylfluorosilyl)benzene having a boiling point of 100° C. at 10 mm. of mercury and a refractive index $n_D^{25}$ of 1.4642. Elemental analysis of the 1,4-bis(dimethylfluorosilyl)benzene gave the following results:

Calculated for $C_{10}H_{16}F_2Si_2$: C, 52.1%; H, 6.9%; Si, 24.3%. Found: C, 51.7%; H, 7.1%; Si, 24.6%.

(C) A solution of 60 grams (0.26 mole) of 1,4-bis(dimethylfluorosily)benzene $(CH_3)_2FSiC_6H_4$—Si $(CH_3)_2F$ in 200 ml. of benzene was added with rapid stirring to a mixture of 100 ml. of concentrated ammonium hydroxide and 200 grams of ice. The time of addition was about 1 hour. Stirring was continued until the mixture had attained room temperature. The mixture was filtered, and the solid product was washed several times with distilled water and then with cold benzene. 1,4-bis(dimethylhydroxysilyl)benzene $$1,4[(CH_3)_2SiOH]_2C_6H_4$$

was obtained in 80–98% yield. The material was recrystallized from hot benzene in 90% yield (employing about 150 g. of 1,4[(CH₃)₂SiOH]₂C₆H₄ per 4 lb. of benzene). The recrystallized 1,4[(CH₃)₂SiOH]₂C₆H₄ melts at 130–140° C. Elemental analysis of the recrystallized 1,4-bis(dimethylhydroxysilyl)benzene gave the following results:

Calculated for $C_{10}H_{18}O_2Si_2$: 53.0% C; 8.0% H; 25.0% Si. Found: 53.6% C; 8.4% H; 24.8% Si.

EXPERIMENT 2

(A) In a 5-liter flask equipped with a stirrer, addition funnel, reflux condenser and a means for maintaining an inert atmosphere, was placed 97 g. (4 g.-atoms) of magnesium turnings. A solution of 592 g. (4 moles) of dimethyldiethoxysilane in 1.2 liters of anhydrous tetrahydrofuran was prepared. A portion of this solution was used to just cover the metal turnings in the flask. About 50 ml. of a solution of 4,4'-dibromophenyl ether (500 g., 1.5 moles) in one liter of anhydrous tetrahydrofuran was then added to the flask. To initiate the reaction 10 g. of p-dibromobenzene was added and the mixture was heated to reflux. The remainder of the dimethyldiethoxysilane-tetrahydrofuran solution was added. The remainder of the 4,4'-dibromophenyl ether solution was then added over a 2-hour period. During the latter addition the reaction became self-sustaining. After the addition was completed, the mixture was refluxed for an additional 3.5 hours. The reaction mixture was cooled and filtered to remove magnesium salts. The tetrahydrofuran and excesss dimethyldiethoxysilane were then removed by vacuum evaporation and the residue filtered. The filtrate was subject to fractional distillation at reduced pressure of yield 4,4'-bis(dimethylethoxysilyl)-phenylether, B.P. 176° C. at 1 mm. Hg; $n_D^{25}=1.5176$. Elemental analysis of the 4,4'-bis(dimethylethoxysilyl)-phenylether gave the following results:

Calculated for $C_{20}H_{30}O_3Si_2$: 64.1% C; 8.07% H; 14.98% Si. Found: 64.3% C; 8.3% H; 15.0% Si.

(B) In a 500-ml. flask equipped with a thermometer well, were placed 205 g. (0.55 mole) of 4,4'-bis(dimethylethoxysilyl)phenyl ether and 60 g .(0.42 mole) of boron trifluoride etherate. The homogeneous mixture was heated until the pot temperature reached 200° C. During this time the volatile by-products, such as ethyl borate were removed by fractional distillation of the residue under reduced pressure yielded 157 grams of 4,4'-bis(dimethylfluorosilyl)phenylether, B.P. 145°–146° C. at 0.7 mm. Hg.; $n_D^{25}=1.5176$. Elemental analysis of the 4,4'-bis(dimethylfluorosilyl)phenylether gave the following results:

Calculated for $C_{16}H_{20}F_2OSi_2$: 59.6% C; 6.3% H; 17.4% Si. Found: 59.5% C; 6.2% H; 17.4% Si.

(C) A solution of 20 ml. of 4,4'-bis(dimethylfluorosilyl)phenyl ether in 250 ml. of benzene was shaken in a glass vessel with 200 ml. of ice water and 100 ml. of concentrated ammonium hydroxide for 48 hours. The organic layer was separated, the benzene removed by vacuum evaporation. The residue was dissolved in ether, the solution filtered and the ether than removed by vacuum evaporation. An extremely viscous fluid was obtained which crystallized upon standing. The solid, crystalline material was 4,4'-bis(dimethylhydroxysilyl)phenyl ether which melts with decomposition at 85–91° C. Analysis of the 4,4'-bis(dimethylhydroxysilyl)phenylether gave the following results:

Calculated for $C_{16}H_{20}O_3Si_2$: 60.4% C; 7.0% H; 17.6% Si. Found: 61.0% C; 7.1% H; 17.9% Si.

If methylcyclohexane is used as the solvent for the hydrolysis, the 4,4' - bis(dimethylhydroxylsilyl)phenyl-ether is obtained in crystalline form directly; however, recrystallization from this solvent gives a material which contains methylcyclohexane as part of the crystalline structure. The presence of this solvent does not interfere in the preparation of polymers. For example, 4,4'-bis(dimethylhydroxysilyl)phenyl ether was obtained in the form of bright platelets from hot methylcyclohexane. The material was thoroughly dried under vacuum and had a melting point of 85–96.5° C. with decomposition.

The following examples serve to further illustrate the invention.

*Example 1*

In a glass reaction vessel were placed 1,4-bis(dimethylhydroxysilyl)benzene (26 grams) 4,4'-bis(dimethylhydroxysilyl)phenylether (74 grams) and a dimethylpolysiloxane-ethylvinylsiloxane copolymer containing 36.5 percent by weight ethylvinylsiloxane units and 63.5 percent by weight dimethylsiloxane units (1.6 grams). The mixture was heated to 150° C. and sufficient potassium dimethylsilanolate, containing 3% by weight potassium was added so that the mixture contained 250 parts by weight potassium per million parts by weight of the siloxanes. The mixture was heated at 150° C. for 72 hours and then heated for an additional 2 hours at 150° C. and 1 mm. Hg pressure to yield a copolymeric polysiloxane gum. The copolymeric polysiloxane gum was obtained as a hard, tough white solid, having a miniature penetrometer reading of less than 10 and an intrinsic viscosity number of 0.56 deciliter per gram in benzene at 20° C. The copolymeric polysiloxane gum contained about 63.32 mole-percent of bis-(dimethylsilyl)-phenylether siloxane units,

about 31.25 mole-percent of bis-(dimethylsilyl)benzene siloxane units [(CH₃)₂Si—C₆H₄—Si(CH₃)₂O], about 3.8 mole-percent dimethylsiloxane units and about 1.63 mole-percent ethylvinylsiloxane units.

*Example 2*

In a glass reaction vessel were placed 4,4'-bis(dimethylhydroxysilyl)phenyl ether (240 grams), 1,4'-bis(dimethylhydroxysilyl)benzene (160 grams) and methylvinylcyclotetrasiloxane (1.2 grams) and the mixture was heated to 160° C. Sufficient potassium dimethylsilanolate, containing 3% by weight potassium (K⁺) was added so that the mixture contained 60 parts by weight potassium per million parts by weight of the silicon compound. The mixture was then maintained at 160° C. for 19 hours to cause the silicon compounds to condense and equilibration to yield a copolymeric polysiloxane gum. The copolymeric polysiloxane gum had a miniature penetrometer reading of less than ten and an intrinsic viscosity number of 1.97 deciliters per gram in toluene. The copolymeric polysiloxane gum contained about 48.74 mole-percent of bis(dimethylsilyl)phenyl ether siloxane units, about 50.35 mole-percent of bis-(dimethylsilyl)benzene-siloxane units and about .91 mole-percent methylvinylsiloxane units.

*Example 3*

The copolymeric polysiloxane gum (100 parts by weight) prepared in Example 1 was compounded with a finely divided silica filler (30 parts by weight), ferric oxide (2 parts by weight), and dibenzoyl peroxide (2 parts by weight) or a water-cooled 2 roll rubber mill at ambient temperatures. After the ingredients were well mixed, the compound was sheeted from the mill and cured in a mold (6″ x 6″ x .075″) for 15 minutes at 250° F. The elastomer thus prepared was postcured in a forced-draft oven for 24 hours at 480° F. The physical properties of this elastomer designated "A" is given in Table I.

*Example 4*

The copolymeric polysiloxane gum (100 parts by weight) prepared in Example 2 was compounded with a finely divided silica filler (45 parts by weight), ferric oxide (2 parts by weight), an ethoxy end-blocked dimethylpolysiloxane fluid having the average formula

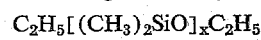

where x is 15 to 25 (15 parts by weight) and ditertiary-butyl peroxide (1 part by weight) on a water-cooled 2 roll rubber mill at ambient temperature.

After the ingredients were well mixed, the compound was sheeted from the mill and cured in a mold (6" x 6" x .075") for 20 minutes at 340° F. The elastomer thus prepared was postcured in a forced-draft oven for 24 hours at 480° F. The physical properties of this elastomer designated "B" is given in Table I.

TABLE I.—PHYSICAL PROPERTIES

| Elastomers | Mold Cured | | | | After 24 hrs. at 480° F. | | | |
|---|---|---|---|---|---|---|---|---|
| | Tensile, p.s.i. | Elongation, percent | Hardness Shore A | Set at Break, percent | Tensile, p.s.i. | Elongation, percent | Hardness Shore A | Set at Break, percent |
| A | 1,183 | 350 | 68 | 20 | 1,400 | 170 | 80 | 8 |
| B | 1,534 | 460 | 78 | 25 | 2,330 | 340 | 85 | 10 |
| C* | 950 | 500 | 56 | 5 | 80 | 225 | 80 | 0 |

*An elastomer prepared from a dimethylpolysiloxane gum containing 0.35 percent by weight ethylvinylsiloxane units, a finely divided silica filler, iron oxide and ditertiarybutyl peroxide and cured 25 minutes at 340° F.

*Example 5*

The elastomer prepared in Example 4 was subjected to gamma ray radiation and was found to still be elastomeric after exposure to $4 \times 10^8$ rads [1] of gamma irradiation. The following table gives a comparison of the radiation resistance of the elastomer of Example 4 as compared to normal silicone elastomers.

TABLE II

| Elastomer | Amount of γ irradiation (rads) | Tensile (p.s.i.) | Elongation, Percent [1] |
|---|---|---|---|
| From Example 4 | 0 | 2,330 | 340 |
| | $10^8$ | 1,934 | 210 |
| Control Elastomer A [2] | 0 | 800 | 340 |
| | $10^8$ | 560 | 50 |
| Control Elastomer B [3] | 0 | 650 | 400 |
| | $10^8$ | 730 | 20 |

[1] A material having an elongation of 50% or less is not considered to be ab elastomer.
[2] Elastomer prepared from a composition comprising 100 parts by weight of a dimethylpolysiloxane gum containing 12 percent by weight diphenylsiloxane units and 0.35 percent by weight ethylvinylsiloxane units, 38 parts by weight of finely divided silica, 12 parts by weight of an ethoxy end-blocked dimethylpolysiloxane oil and 0.6 part by weight ditertiary butyl peroxide and cured 25 minutes at 340° F.
[3] Elastomer prepared from a composition comprising 100 parts by weight dimethylpolysiloxane gum containing 0.35 percent by weight ethylvinylsiloxane units, 45 parts by weight finely divided silica, 2 parts by weight of ditertiary butyl peroxide and cured 25 minutes at 340° F.

What is claimed is:

1. A random copolymeric organopolysiloxane gum having an intrinsic viscosity number in benzene at 25° C. of at least 0.5 deciliter per gram and a molecular weight of from about 100,000 to about 3,000,000 comprised of
   (a) from 5 to 95 mole percent units of the formula:

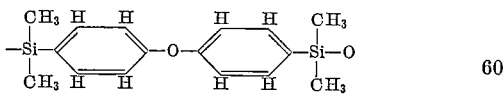

(b) from 5 to 95 mole percent units of the formula:

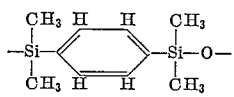

(c) from 0 to 25 mole percent units of the formula:

and (d) from 0 to 1 mole percent units of the formula:

wherein R is a monovalent hydrocarbon radical and R' is an olefinically unsaturated monovalent hydrocarbon radical.

2. A random copolymeric organopolysiloxane gum as claimed in claim 1, wherein the hydrocarbon(olefinically unsaturated hydrocarbon)siloxane units are present in the organopolysiloxane in amounts of from 0.037 to 1.0 mole percent.

3. A random copolymeric organopolysiloxane gum as claimed in claim 2, wherein the olefinically unsaturated hydrocarbon group is a vinyl group.

4. A random copolymeric organopolysiloxane gum as claimed in claim 3 wherein any end-blocking groups present in said organopolysiloxane are hydroxy groups.

5. A heat-curable composition comprising (a) 100 parts by weight of a random copolymeric organopolysiloxane gum having an intrinsic viscosity number in benzene at 25° C. of at least 0.5 deciliter per gram and a molecular weight of from about 100,000 to about 3,000,000 comprised of
   (1) from 5 to 95 mole percent units of the formula:

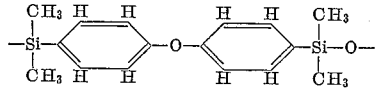

(2) from 5 to 95 mole percent units of the formula:

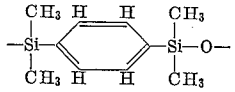

(3) from 0 to 25 mole percent dimethylsiloxane units of the formula:

and (4) from 0 to 1.0 mole percent of hydrocarbon (olefinically unsaturated hydrocarbon)siloxane units of the formula:

wherein R is a monovalent hydrocarbon radical and R' is an olefinically unsaturated monovalent hydrocarbon radical (b) from 10 to 100 parts of a filler and (c) from 0.1 to 2.5 parts of curing catalyst.

6. A heat-curable composition as claimed in claim 5 wherein the random organopolysiloxane gum contains from 0.037 to 1.0 mole percent units of the formula:

---

[1] A rad is an amount of absorbed radiation equivalent to ergs per gram.

where R is a monovalent hydrocarbon group and R' is an olefinically unsaturated hydrocarbon group.

7. A heat-curable composition as claimed in claim 6 wherein R' represents a vinyl group.

8. An organopolysiloxane elastomer which comprises a heat-cured composition comprising (a) 100 parts by weight of a random copolymeric organopolysiloxane gum having an intrinsic viscosity number in benzene at 25° C. of at least 0.5 deciliter per gram and a molecular weight of from about 100,000 to about 3,000,000 comprised of (1) from 5 to 95 mole percent units of the formula:

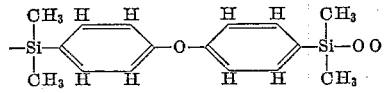

(2) from 5 to 95 mole percent units of the formula:

(3) from 0 to 25 mole percent dimethylsiloxane units of the formula:

and (4) from 0 to 1.0 mole percent of hydrocarbon-(olefinically unsaturated hydrocarbon)siloxane units of the formula:

wherein R is a monovalent hydrocarbon radical and R' is an olefinically unsaturated monovalent hydrocarbon radical, (b) from 10 to 100 parts of a filler and (c) from 0.1 to 2.5 parts of a curing catalyst.

9. An organopolysiloxane elastomer as claimed in claim 8 wherein the random organopolysiloxane gum contains from 0.037 to 1.0 mole percent units of the formula:

wherein R is a monovalent hydrocarbon radical and R' is an olefinically unsaturated hydrocarbon group.

10. An organopolysiloxane elastomer as claimed in claim 9 wherein R' represents a vinyl group.

References Cited by the Examiner

UNITED STATES PATENTS

| | | |
|---|---|---|
| 2,561,429 | 7/1951 | Sveda. |
| 2,562,000 | 7/1951 | Sveda. |
| 2,739,638 | 3/1956 | Lewis et al. |
| 3,032,531 | 5/1962 | J. Saylor. |
| 3,086,954 | 4/1963 | Polmanteer et al. |

OTHER REFERENCES

"Introduction to Polymer Chemistry" (Stille). Published by John Wiley and Sons, Inc. New York, 1962, page 61 relied on.

MORRIS LIEBMAN, *Primary Examiner.*

MILTON STERMAN, *Examiner.*

H. W. HAEUSSLER, J. W. BEHRINGER, J. E. CALLAGHAN, *Assistant Examiners.*